United States Patent [19]

Lundy et al.

[11] Patent Number: 5,006,572

[45] Date of Patent: Apr. 9, 1991

[54] GAMMA RADIATION RESISTANT POLYCARBONATE COMPOSITION

[75] Inventors: Charles E. Lundy; Roger J. White; Sivaram Krishnan, all of Pittsburgh, Pa.

[73] Assignee: Mobay Corporation, Pittsburgh, Pa.

[21] Appl. No.: 403,202

[22] Filed: Sep. 5, 1989

Related U.S. Application Data

[63] Continuation-in-part of Ser. No. 301,204, Jan. 24, 1989, abandoned.

[51] Int. Cl.$^5$ .................. C08K 5/15; C08K 5/06
[52] U.S. Cl. .................. 523/136; 524/109; 524/110; 524/263; 524/359; 524/367; 524/369; 524/384
[58] Field of Search .......... 523/136; 524/359, 367, 524/369, 263, 110, 109, 384

[56] References Cited

U.S. PATENT DOCUMENTS

| | | | |
|---|---|---|---|
| 3,164,651 | 1/1965 | Chu | 524/384 |
| 3,254,047 | 5/1966 | Caldwell et al. | 524/369 |
| 3,660,331 | 5/1972 | Ludwig | 524/110 |
| 3,843,402 | 10/1974 | Albarino et al. | 523/136 |
| 4,056,665 | 11/1977 | Taylor et al. | 524/359 |
| 4,130,530 | 12/1978 | Mark et al. | 524/267 |
| 4,145,329 | 3/1979 | Mark et al. | 524/267 |
| 4,172,858 | 10/1979 | Clubley et al. | 524/369 |
| 4,431,497 | 2/1984 | Rekers | 524/384 |
| 4,515,666 | 5/1985 | Rekers | 524/359 |
| 4,632,956 | 12/1986 | Kress et al. | 524/359 |
| 4,663,374 | 5/1987 | Sonoda | 524/267 |
| 4,804,692 | 2/1989 | Lundy et al. | 524/611 |
| 4,874,802 | 10/1989 | Lundy et al. | 524/367 |
| 4,876,309 | 10/1989 | Nelson et al. | 524/109 |
| 4,880,850 | 11/1989 | Nelson et al. | 524/386 |
| 4,894,401 | 1/1990 | Nelson | 524/109 |

FOREIGN PATENT DOCUMENTS

| | | | |
|---|---|---|---|
| 296473 | 12/1988 | European Pat. Off. | 524/110 |
| 60-84383 | 5/1985 | Japan . | |
| 1412335 | 11/1975 | United Kingdom . | |

*Primary Examiner*—Veronica P. Hoke
*Attorney, Agent, or Firm*—Joseph C. Gil; Aron Preis

[57] ABSTRACT

The invention relates to thermoplastic molding compositions comprising a polycarbonate resin which is rendered resistant to gamma radiation induced yellowing. It was surprisingly found that the incorporation in the resin of an effective amount of benzylic alcohol or its derivatized versions renders the composition resistant to yellowing. The composition of the invention is suitable for the preparation of molded articles having improved resistance to yellowing and to the formation of haze induced upon exposure to gamma radiation.

13 Claims, No Drawings

GAMMA RADIATION RESISTANT POLYCARBONATE COMPOSITION

This application is a Continuation-In-Part of U.S. application, Ser. No. 07/301,204, filed Jan. 24, 1989 now abandoned.

FIELD OF THE INVENTION

The invention concerns polycarbonate molding compositions and more particularly a thermoplastic molding composition resistant to gamma radiation-induced yellowness.

BACKGROUND OF THE INVENTION

Because of their physical and mechanical properties polycarbonate resins were found to be eminently suitable for a variety of applications in the medical field. Applications which require sterilization by exposure to gamma radiation present a problem since polycarbonate tends to yellow and show increased haze. One solution to the problem was proposed in U.S. Pat. No. 4,624,972 which disclosed polycarbonate compositions containing an ester of an aromatic polycarboxylic acid. European Patent Application 152,012 disclosed a method for increasing the ionizing radiation resistance of polycarbonate by including in the composition a non-polymeric compound which is characterized by a strong oxidizing action and/or reaction at high reaction rate with active species such as E or OH radicals or hydrated electrons formed by ionizing radiation. U.S. Pat. No. 4,451,641 disclosed a container prepared from a copolyester which has been modified with either a dimer acid or a dimer glycol. The copolyester is said to have an improved resistance to gamma radiation. Radiation stable polyolefin compositions have been disclosed in U.S. Pat. No. 4,460,445. Copending U.S. patent application Ser. No. 07/305,301 filed Feb. 1, 1989 pending (a continuation of U.S. Ser. Nos. 67,670 filed June 26, 1987) and 07/297,264 filed Jan. 18, 1989 now U.S. Pat. No. 4,963,598 (a continuation-in-part of Ser. No. 183,023 filed Apr. 18, 1988) relate to relevant technology.

SUMMARY OF THE INVENTION

The invention relates to a thermoplastic molding composition comprising a polycarbonate resin and a stabilizing agent. The composition is characterized in its resistance to gamma-radiation-induced-yellowing (hereinafter yellowing). It was surprisingly found that the incorporation in the resin of an additive amount of a compound which contains benzylic alcohol or its derivative renders the resultant composition resistant to yellowing. The composition of the invention is suitable for the preparation of molded articles having improved resistance to yellowing and to the gamma-radiation-induced haze.

DETAILED DESCRIPTION OF THE INVENTION

The composition of the invention comprises a polycarbonate resin and a stabilizing agent in an amount sufficient to enhance the resistance of the resin to yellowing and gamma radiation induced haze. Preferably, the composition contains about 0.01 to 5.0, more preferably 0.01 to 1 percent of the stabilizing agent, said percent being relative to the weight of the composition.

The polycarbonate resins useful in the practice of the invention are homopolycarbonates, copolycarbonates and terpolycarbonates or mixtures thereof. The polycarbonates generally have a weight average molecular weight of 10,000–200,000, preferably 20,000–80,000 and their melt flow rate, per ASTM D-1238 at 300° C., is about 1 to about 65 gm/10 min., preferably about 2–15 gm/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, 1964, all incorporated herein by reference).

In the present context, dihydroxy compounds suitable for the preparation of the polycarbonates of the invention conform to the structural formulae (1) or (2)

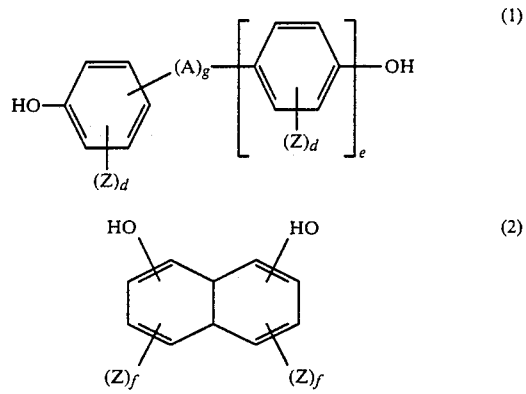

wherein A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

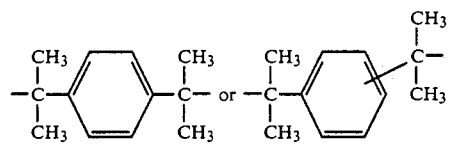

e and g both denote the number 0 to 1;
Z denotes F, Cl, Br or C$_1$-C$_4$-alkyl and if several Z radicals are substituents in one aryl radical, they may be identical or different one from the other;
d denotes an integer of from 0 to 4; and
f denotes an integer of from 0 to 3.

Among the dihydroxy compounds useful in the practice of the invention are hydroquinone, resorcinol, bis-(hydroxyphenyl) alkanes, bis-(hydroxyphenyl) ethers, bis-(hydroxyphenyl)-ketones, bis-(hydroxyphenyl)-sulfoxides, bis-(hydroxyphenyl)-sulfides, bis-(hydroxyphenyl)-sulfones, and α,α'-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2,-bis-(4-hydroxyphenyl)-propane (bisphenol A), 2,4- bis-(4-hydroxyphenyl)-2-methyl-butane, 1,1,-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfone, hydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-( 4-hydroxyphenyl)-heptane; 1,3,5-tri-(4-hydroxyphenyl)-benzene; 1,1,1-tri-(4-hydroxyphenyl)-ethane; tri-(4-hydroxy-phenyl)-phenylmethane; 2,2-bis-[4,4-(4,4'-dihydroxy-diphenyl)-cyclohexyl]-propane; 2,4-bis-(4-hydroxy-1-isopropylidene)-phenol; 2,6-bis-(2'-dihydroxy-5'-methyl-benzyl)-4-methylphenol; 2,4-dihydroxybenzoic acid; 2-(4-hydroxyphenyl)-2-(2,4-dihydroxyphenyl)-propane and 1,4-bis-(4,4'-dihydroxy-triphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance as Makrolon FCR, Makrolon 2600, Makrolon 2800 and Makrolon 3100, all of which are bisphenol A based homopolycarbonate resins differing in terms of their respective molecular weights and characterized in that their melt flow indices (MFR) per ASTM D-1238 are about 16.5–24, 9–14, 7.5–13.0 and 3.5–6.5 gm/10 min., respectively. These are products of Mobay Corporation of Pittsburgh, Pa.

The stabilizing agent in accordance with the present invention comprises a benzylic alcohol or its derivatives (hereinafter benzylic alcohol). Preferably the agent is a member selected from the group consisting of benzoins, hydrobenzoins, benzhydrols and their respective derivatives. Stabilizers of the invention include

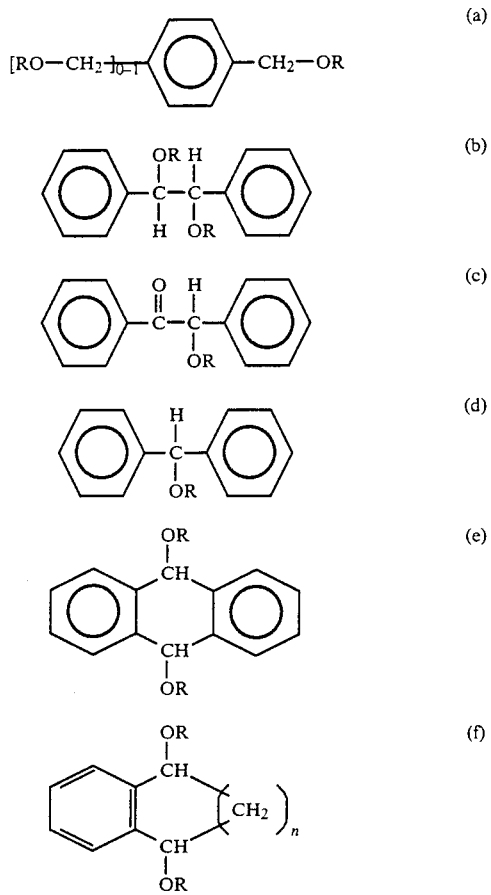

wherein n = 1–3 wherein R denotes a hydrogen atom, a hydroxyl radical, a $C_1$-$C_{30}$ alkyl, a cycloalkyl radical which contains a heteroatom, or an aryl radical. Derivatives of dihydropyran or trimethylsilylchloride are preferred. Most preferably, R denotes a derivative of dihydropyran.

In accordance with the practice of the present invention, a thermoplastic molding composition comprising a polycarbonate resin and an amount of a stabilizing agent is prepared by mixing the agent in the resin to obtain a homogeneous blend. The amount of the stabilizer is that which is sufficient to improve the resistance of the resin to yellowing. The composition is suitable for the preparation of molded articles. These articles, primarily ones having applicability in the medical field and thus requiring periodic sterilization by exposure to gamma radiation, are characterized by their improved resistance to yellowness and haze which are typically induced in polycarbonate made articles upon their sterilization by exposure to gamma radiation. The effective amount of the stabilizing agent is that amount which improves the resistance to gamma radiation induced yellowness and-/or haze of articles molded from unstabilized polycarbonate resin. Preferably the amount of stabilizer is about 0.01 to 5.0, more preferably, the amount is about 0.01 to 1.0 percent relative to the weight of the composition. The incorporation of the stabilizer in the composition of the invention is carried out following conventional procedures and means well known in the art. The stabilizing agent of the invention may be introduced in the polycarbonate matrix by direct mixing with the resin or by introducing it to the reaction vessel during the production of the polycarbonate resin.

Other conventional additives may also be incorporated in the composition for their art recognized utilities. These additives include release agents, plasticizers, stabilizers, antioxidants, fillers, reinforcements and the like.

The stabilizer of the invention may be readily synthesized following conventional procedures. The example set forth below demonstrates the preparation of a stabilizer conforming to

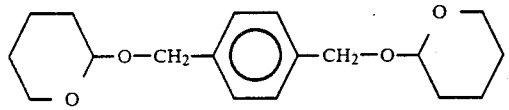

The invention is further illustrated but is not intended to be limited by the following examples in which all parts and percentages are by weight unless otherwise specified.

EXAMPLES

EXAMPLE 1

Benzyl alcohol in the amount of 50 gms was introduced into a solvent (acetone) in an amount of 600 ml in a three necked flask. In addition, a catalytic amount of tosyl acid was added (the catalytic amount was 0.1 gm). To this was slowly added 75 gm of dihydropyran. This amount is the equivalent molar amount of dihydropyran based on the amount of the alcohol. After four (4) hours there was added triethyl amine to complex the acid catalyst. After filtration, the solvent was removed. The resulting materials were light in color and had an OH number of less than 16.

Other catalysts suitable in the process include other protonic acids. Other suitable solvents include tetrahydrofuran and heptane.

EXAMPLE 2

Several compositions stabilized in accordance with the invention were prepared and test specimens were molded therefrom. The specimens were then evaluated to determine their yellowness index in accordance with ASTM 1925-70. The test specimens were then exposed to gamma radiation and their yellowness index determined three days after exposure to the indicated radiation dosage; prior to the determination, the samples were stored in the dark. The table below summarizes the results of the evaluation.

TABLE 1

| Type of Added Stabilizer | Amount of Added Stabilizer (%) | Yellowness Index After Exposure to Gamma Radiation | | |
|---|---|---|---|---|
| | | 0.0 | 3.5 Mrads | 5.0 Mrads |
| Control | 0.0 | 3.64 | 22.15 | 42.91 |
| Hydrobenzoin tetra- hydropyranyl ether[1] | 1.0 | 3.16 | 11.20 | 16.19 |
| Benzoin[2] | 0.5 | 3.15 | 12.48 | 18.92 |
| Benzoin tetra- hydropyranyl ether[3] | 1.0 | 6.78 | 13.73 | 19.89 |
| Benzhydrol[4] | 1.0 | 3.27 | 13.13 | 10.03 |

[1] Conforming to compound (b) above wherein R is a derivative of dihydropyran.
[2] Conforming to compound (c) wherein R is an OH group.
[3] Conforming to formula (c) above wherein R is a dihydropyran derivative.
[4] Conforming to (d) above where R is an OH group.

In all the experiments described above, the polycarbonate used for the preparation of the test specimens was Makrolon 2608 resin which is a homopolycarbonate based on bisphenol A, having a melt flow index of 9-14 gm/10 min. Makrolon resins are commercial products of Mobay Corporation.

While the yellowness index of polycarbonate compositions containing the derivatized version of the stabilizer of the invention is comparable to that of compositions containing the non-derivatized versions, the former compositions are further characterized by their superior thermal stability and virtual freedom from splay.

EXAMPLE 3

Preparation of an end-capped benzene dimethanol (dihydropyran end-capping): 1,4-Benzene dimethanol (50 g) was dissolved into 600 ml of acetone in a three-necked flask equipped with a stirring apparatus, condenser, dropping funnel, and nitrogen purge. After dissolving the mixture at 40° C., 0.1 g of toluene sulfonic acid was added, then dihydropyran (75 g) was added dropwise over a 1 hour period. After four hours reaction and cooling, triethyl amine (0.07 g) was added. After filtration, the solution was stripped of solvent. The resulting product was a clear slightly yellow liquid.

EXAMPLE 4

The end-capped agent thus prepared was incorporated in a polycarbonate resin and specimens were molded from the composition. The specimens were subjected to gamma radiation, the change in yellowness index was measured and the results are reported below. The effect of the radiation was determined on specimens which were injection molded at 550° F. (Melt temperature).

In all the experiments noted below, the polycarbonate was Makrolon resin, a bisphenol-A based polycarbonate resin having a melt flow rate of about 19 g/10 min per ASTM D-1238—a product of Mobay Corporation. In the Table below there is shown the effect of gamma radiation on specimens molded from polycarbonate resin which contained no stabilizing additives set in comparison to the effect on specimens made from compositions containing another stabilizer not within the scope of the present invention.

| Composition | Yellowness Index After Exposure to Gamma Radiation | | |
|---|---|---|---|
| | 0.0 Mrads | 3.5 Mrads | 5.0 Mrads |
| Control[1], no | 3.35 | 13.05 | 26.31 |

-continued

| Composition | Yellowness Index After Exposure to Gamma Radiation | | |
|---|---|---|---|
| | 0.0 Mrads | 3.5 Mrads | 5.0 Mrads |
| stabilizer | | | |
| 1% added cyclohexane dimethanol tetrahydro-pyranyl ether[2] | 3.79 | 8.98 | 12.98 |
| 1% added cyclohexane diol tetrahydropyranyl ether[3] | 3.25 | 7.42 | N.D.[5] |
| 1% added benzene dimethanol tetrahydro-pyranyl ether[4] | 3.52 | 5.79 | 8.06 |

[1] Makrolon 2608, a bisphenol A based homopolycarbonate.
[2] A bis-dihydropyran terminated cyclohexane dimethanol.
[3] A bis-dihydropyran terminated cyclohexane-diol.
[4] A bis-dihydropyran terminated benzene dimethanol.
[5] Not determined.

Although the invention has been described in detail in the foregoing for the purpose of illustration, it is to understood that such detail is solely for that purpose and that variations can be made therein by those skilled in the art without departing from the spirit and scope of the invention except as it may be limited by the claims.

What is claimed is:

1. A polycarbonate molding composition comprising a homogeneous blend of (i) an aromatic polycarbonate resin and (ii) about 0.01 to about 5.0% relative to the weight of the composition of a member selected from the group consisting of

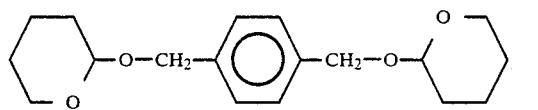 (a)

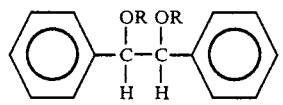 (b)

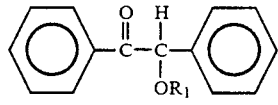 (c)

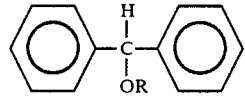 (d)

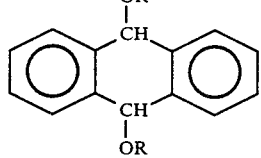 (e)

and

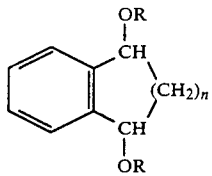 (f)

wherein R and $R_1$ denote a $C_{1-30}$ alkyl or aryl radical or a dihydropyran and n is 1 to 3.

2. A molded article prepared from the composition of claim 1.

3. A polycarbonate molding composition comprising a homogeneous blend (i) an aromatic polycarbonate resin and (ii) about 0.01 to 5.0% relative to the weight of said composition of a compound conforming to

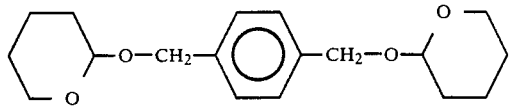

4. A polycarbonate molding composition comprising a homogeneous blend (i) an aromatic polycarbonate resin and (ii) about 0.01 to 5.0% relative to the weight of said composition of a compound conforming to

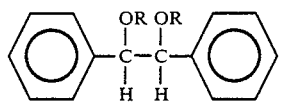

wherein R denotes an alkyl or aryl radical having 1 to 30 carbon atoms, on a dihydropyran.

5. A polycarbonate molding composition comprising a homogeneous blend (i) an aromatic polycarbonate resin and (ii) about 0.01 to 5.0% relative to the weight of said composition of a compound comforming to

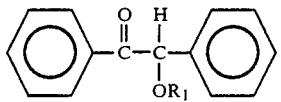

wherein $R_1$ denotes an alkyl or aryl radical having 1 to 30 carbon atoms, on a dihydropyran.

6. A polycarbonate molding composition comprising a homogeneous blend (i) an aromatic polycarbonate resin and (ii) about 0.01 to 5.0% relative to the weight of said composition of a compound conforming to

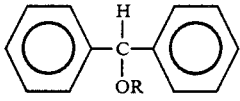

wherein R denotes an alkyl or aryl radical having 1 to 30 carbon atoms, on a dihydropyran.

7. A polycarbonate molding composition comprising a homogeneous blend (i) an aromatic polycarbonate resin and (ii) about 0.01 to 5.0% relative to the weight of said composition of a compound conforming to

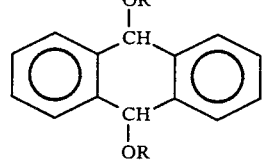

wherein R denotes an alkyl or aryl radical having 1 to 30 carbon atoms, on a dihydropyran.

8. A polycarbonate molding composition comprising a homogeneous blend (i) an aromatic polycarbonate resin and (ii) about 0.01 to 5.0% relative to the weight of said composition of a compound conforming to

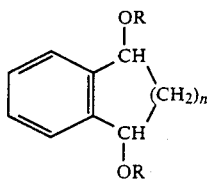

wherein R denotes an alkyl or aryl radical having 1 to 30 carbon atoms, on a dihydropyran and n is 1 to 3.

9. A molded article prepared from the composition of claim 3.

10. A molded article prepared from the composition of claim 4.

11. A molded article prepared from the composition of claim 5.

12. A molded article prepared from the composition of claim 6.

13. A molded article prepared from the composition of claim 7.

* * * * *